US011977725B2

(12) United States Patent
Kerber, III et al.

(10) Patent No.: US 11,977,725 B2
(45) Date of Patent: May 7, 2024

(54) AUTHORING SYSTEM FOR INTERACTIVE VIRTUAL REALITY ENVIRONMENTS

(71) Applicant: Human Mode, LLC, Oklahoma City, OK (US)

(72) Inventors: William Xavier Kerber, III, Edmond, OK (US); Yoon Joon So, Oklahoma City, OK (US); Jae Rim Choi, Oklahoma City, OK (US)

(73) Assignee: Human Mode, LLC, Oklahoma City, OK (US)

( * ) Notice: Subject to any disclaimer, the term of this patent is extended or adjusted under 35 U.S.C. 154(b) by 0 days.

(21) Appl. No.: 16/549,609

(22) Filed: Aug. 23, 2019

(65) Prior Publication Data

US 2021/0042023 A1 Feb. 11, 2021

Related U.S. Application Data

(60) Provisional application No. 62/884,020, filed on Aug. 7, 2019.

(51) Int. Cl.
*G06F 3/04847* (2022.01)
*G06F 3/04815* (2022.01)
(Continued)

(52) U.S. Cl.
CPC ...... *G06F 3/04847* (2013.01); *G06F 3/04815* (2013.01); *G06F 3/0482* (2013.01); *G06F 8/65* (2013.01); *H04L 67/131* (2022.05)

(58) Field of Classification Search
CPC ............. G06F 3/04847; G06F 3/04815; G06F 3/0482; G06F 8/65; H04L 67/38
See application file for complete search history.

(56) References Cited

U.S. PATENT DOCUMENTS 6,629,065 B1 9/2003 Gadh et al.
7,019,743 B1\* 3/2006 Wainwright .......... G06F 3/0486
715/846

(Continued)

FOREIGN PATENT DOCUMENTS

WO    WO/2018/047102    3/2018

OTHER PUBLICATIONS

Vasser et al., VREX: an open-source toolbox for creating 3D virtual reality experiments, BMC Psychology (2017) 5:4.
(Continued)

*Primary Examiner* — Michael Roswell
(74) *Attorney, Agent, or Firm* — DUNLAP CODDING, P.C.

(57) ABSTRACT

Systems and methods are disclosed, including a non-transitory computer readable medium storing computer executable code that when executed by a processor cause the processor to project a mixed reality environment to a headset, the mixed reality environment having one or more objects, each being created by object computer code having properties that define how the objects interact within the mixed reality environment; in response to a first input from at least one user interface device, display an action menu on the visual feedback screen having a list of pre-defined action modules, the action modules including a module of computer executable code having one or more functions, the one or more functions configured to affect one or more properties of a first object of the one or more objects within the mixed reality environment; and update the object computer code of the first object to include a selected action module.

17 Claims, 13 Drawing Sheets

(51) Int. Cl.
*G06F 3/0482* (2013.01)
*G06F 8/65* (2018.01)
*H04L 67/131* (2022.01)

(56) References Cited

U.S. PATENT DOCUMENTS

| | | | |
|---|---|---|---|
| 7,046,151 | B2 | 5/2006 | Dundon |
| 7,102,635 | B2 | 9/2006 | Shih et al. |
| 8,150,941 | B2 | 4/2012 | Edecker et al. |
| 9,383,895 | B1 | 7/2016 | Vinayak et al. |
| 10,235,807 | B2 | 3/2019 | Thomas et al. |
| 2002/0123812 | A1 | 9/2002 | Jayaram et al. |
| 2008/0307388 | A1* | 12/2008 | Ralls ............... G06F 9/451 717/115 |
| 2010/0164990 | A1* | 7/2010 | Van Doorn ......... G02B 27/017 345/633 |
| 2016/0253067 | A1* | 9/2016 | Webb ............... G06F 3/0482 463/31 |
| 2016/0266645 | A1 | 9/2016 | Marozau et al. |
| 2016/0342318 | A1* | 11/2016 | Melchner ............ G06F 8/34 |
| 2017/0228130 | A1* | 8/2017 | Palmaro ........... G06F 3/04815 |
| 2018/0350134 | A1* | 12/2018 | Lodato ............. G06T 17/00 |
| 2019/0004791 | A1 | 1/2019 | Brebner |
| 2019/0340832 | A1* | 11/2019 | Srinivasan ......... G06T 19/006 |
| 2019/0370544 | A1* | 12/2019 | Wright, Jr. ......... G06F 3/0488 |

OTHER PUBLICATIONS

Hunter, Tutorial: Prototyping VR Interactions {No Coding Required}, https://virtualrealitypop.com/basic-vr-interaction-prototyping-tutorial-for-designers-no-coding-required-e5249993e872, Jun. 29, 2017.

Pan et al., Catching a Real Ball in Virtual Reality, 2017 IEEE Virtual Reality (VR), IEEE, 2017.

Cheok et al., Connecting the Real World and Virtual World Through Gaming, Building the Information Society, IFIP International Federation for Information Processing, vol. 156. Springer, Boston, MA pp. 45-50, 2004.

SteamVR/Environments, https://developer.valvesoftware.com/wiki/SteamVR/Environments, Mar. 27, 2019.

Unreal Engine VR Mode, https://docs.unrealengine.com/en-US/Engine/Editor/VR/index.html, Downloaded Mar. 27, 2019.

International Search Report and Written Opinion of the International Searching Authority for PCT/US2020/045344, 11 1 pages.

* cited by examiner

AUTHORING SYSTEM FOR INTERACTIVE VIRTUAL REALITY ENVIRONMENTS

INCORPORATION BY REFERENCE

The present patent application claims priority and benefit to and incorporates by reference the entirety of U.S. Provisional Patent Application No. 62/884,020, entitled "AUTHORING SYSTEM FOR INTERACTIVE VIRTUAL REALITY ENVIRONMENTS", filed Aug. 7, 2019, all of which is incorporated herein by reference in its entirety.

BACKGROUND

As virtual reality hardware advances, and becomes more capable, and the cost of virtual reality hardware decreases, there in an increased interest in Virtual Reality and its usefulness in various industries, however, many persons outside of the computer programming field do not have the required skills to program a virtual reality environment.

Virtual Reality (VR) is a computer-generated simulation of a three-dimensional environment, including a physics engine, that can be interacted with in a seemingly real or physical way by a person using a Virtual Reality System. The Virtual Reality System includes a screen where multi-projected environments generate images, sounds, and other sensations that simulate a user's physical presence in the virtual environment and may include an interface device where a user can provide input to the virtual environment. Virtual reality systems enable a user to look around the artificial world, move around in it, and interact with virtual objects. This effect is commonly created by VR headsets consisting of a head-mounted display with a small screen in front of the eyes, but can also be created through specially designed rooms with multiple large screens. Virtual Reality typically incorporates auditory and video feedback, but may also include other environmental stimulation such as sensory and force feedback through haptic technology.

Virtual reality environments, also referred to as virtual environments or VR applications, can include, for example, entertainment such as games and multimedia or training such as classroom education or virtual training. Programming virtual reality environments is a complicated and time intensive process further complicated by rendering a complex three-dimensional environment onto two-dimensional computer monitors. Additionally, advanced three-dimensional modeling, texturing, and lighting are skilled and time-consuming processes.

Today, building virtual reality environments generally requires teams of individuals with a broad and advanced skillset including at least graphic art design, computer programming, understanding of three-dimensional math and physics, and audio engineering. Adding an individual with any one of these skills is costly due to demand and need. Moreover, due to the broad and advanced skillset needed to build virtual reality environments, the adoption of virtual reality is limited to those who have these skills or area able to build a team with these skills.

What is needed is a system and method that provides users the ability to create and modify a virtual reality environment that is both simple and within the virtual reality environment being edited. It is to such a system to provide users the ability to create and modify a virtual reality environment that is both simple and within the virtual reality environment being edited that the present disclosure is directed.

SUMMARY

The problem of creating and modifying a virtual reality environment that is both simple and within the virtual reality environment being edited is solved with the systems described herein.

In one embodiment, the present disclosure describes an electronic device comprising a processor, a headset, one or more user interface devices, and a non-transitory computer readable medium. The headset has a visual feedback screen. The non-transitory computer readable medium storing computer executable code that when executed by the processor cause the processor to project a mixed reality environment to the headset. The mixed reality environment has one or more objects. Each of the one or more objects is created by object computer code having properties that define how the one or more objects interact within the mixed reality environment. In response to a first input from at least one user interface device, an action menu is displayed on the visual feedback screen having a list of pre-defined action modules. The action modules include a module of computer executable code having one or more functions, the one or more functions configured to affect one or more properties of a first object of the one or more objects within the mixed reality environment. The object computer code of the first object is updated to include a selected action module.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
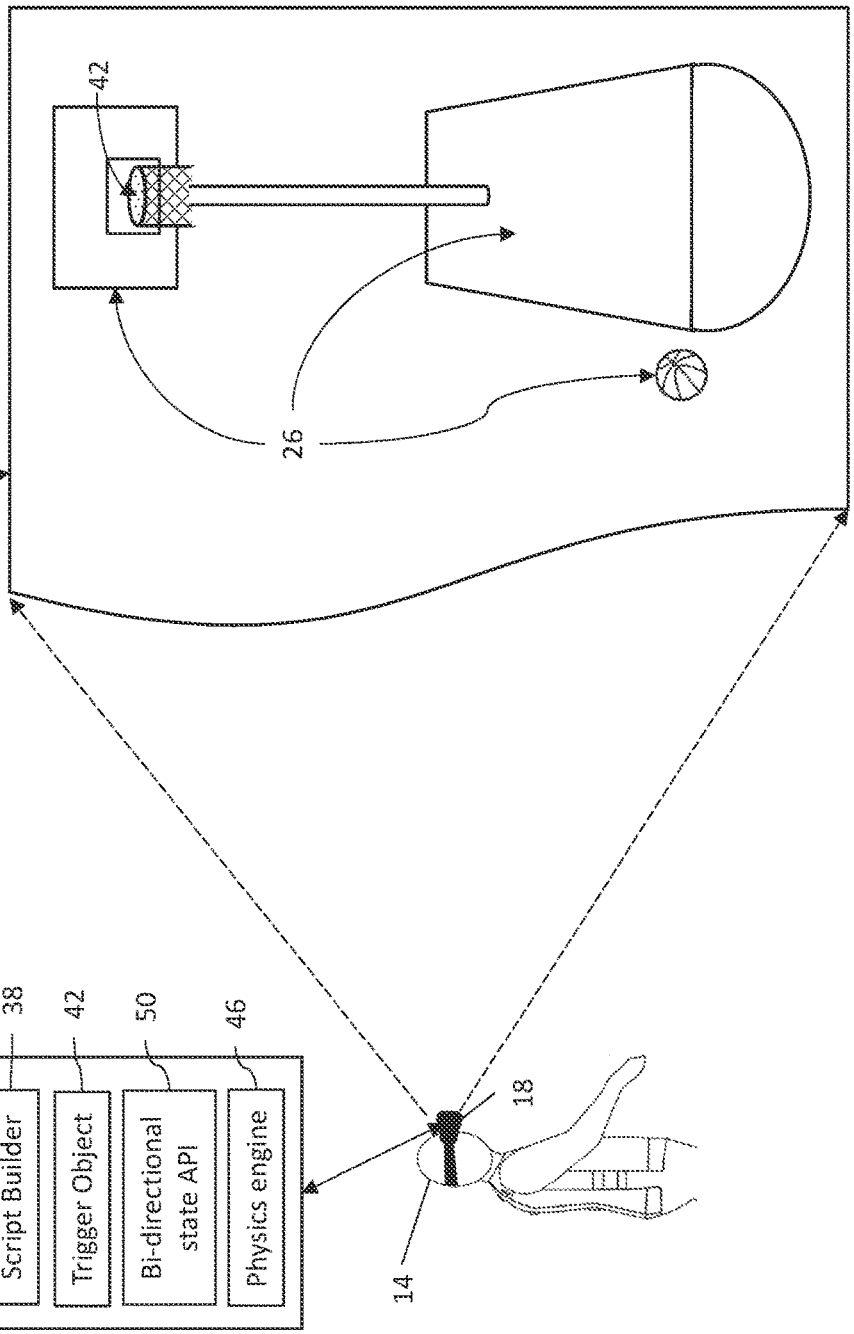
FIG. 1 is an exemplary embodiment of a virtual reality world authoring system.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

A programming language is a set of commands, instructions, and other syntax used to create software. Languages that programmers use to write code are called "high-level languages." High-level language code, which is designed to be read and understood by programmers, is compiled into a "low-level language," which is recognized directly by the computer hardware as computer readable instructions. This allows programmers to write source code in a more natural fashion, using logical words and symbols. Examples of high-level languages include C++, Java, Perl, and PHP. Low-level languages include assembly and machine languages.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, magnetically based, optically based, and/or the like. Software modules are reusable portions of computer executable code having one or more specific functions.

The Virtual Reality System includes a device where projected environments generate images, sounds, and other sensations that simulate a user's physical presence in the virtual environment and may include an interface device wherein a user can provide input to the virtual environment. The Virtual Reality System may further include a processing component, and any environmental stimulator configured to affect one of the senses of the user, such as, but not limited to, equipment configured to produce olfactory stimuli, orientation stimuli, or force stimuli. Virtual reality system may include, but is not limited to, the Oculus Quest, Oculus Go and Oculus Rift (Oculus VR, a division of Facebook Inc., Menlo Park, CA), the SAMSUNG HMD Odyssey+(Samsung Group and Samsung Electronics, San Jose, CA), or Google Cardboard VR platform (Google, LLC, Mountain View, CA). Augmented reality systems may include, but are not limited to, the Microsoft HoloLens (Microsoft Corporation, Redmond, WA) or the Vuzix Blade (Vuzix Corporation, West Henrietta, NY). The term virtual reality headset should be read to include the virtual reality system unless it is clear by the context that the virtual reality headset is intended to refer to the headset unit in isolation.

The virtual environment may include an avatar, that is, a representation of the user within the virtual environment. The avatar is a virtual reality object and may be a photo-realistic representation of the user, may be a generic representation of the user, or may be a representation of a device controlled by the user. In some embodiments, the avatar may move in manner that mirrors or approximates the movements of the user. By mirroring or approximating the movements of the user, the avatar further enhances the virtual environment by creating a more immersive experience for the user by providing visual feedback for the user's real-world movements.

The virtual environment may include a physics engine. A physics engine is a module of computer code that simulates physical and mass interactions for objects within the virtual environment. The physics engine may provide collision detection, that is, it provides a module of computer code that is used to determine whether a first object is intersecting a second object and raises events when the status of the intersection changes. For example, if the first object with a collision trigger scriptable action attached (described in more detail below) intersects the second object, collision detection will raise an entered event and when each of the first and second objects no longer intersect, collision detection will raise an exited event. Each event has one or more properties that may include location of the collision as well as the properties of each of the objects in the collision, such as object velocity, object mass, and object material. Additionally, the physics engine provides dynamics simulations, that is, simulations of forces acting on one or more objects within the virtual environment, such as but not limited to the force of gravity or the simulation of the mechanics of materials.

As used herein, the term Virtual Reality further includes supplemented reality such as augmented reality and mixed reality. Augmented reality, an interactive experience of a real-world environment where the objects that reside in the real-world are enhanced by computer-generated perceptual information, sometimes across multiple sensory modalities, including visual, auditory, haptic, somatosensory and olfactory modalities, and mixed reality, a merging of real and virtual worlds to produce new environments and visualizations where physical and digital objects co-exist and interact in real time, may use the same or similar equipment as the virtual reality system. Further, virtual environments may be interchangeable across each of the supplemented reality and virtual reality systems.

A repository is a database or other file storage system stored either locally in the virtual environment generator component, on a computer in a local network, on a computer or server connected to the Internet, or otherwise available for the user 14 to access with permission from a repository owner. A repository owner is an entity that created or has full rights to the repository, including the rights to delete the repository, copy the repository, edit the repository, or share the repository with varying degrees of permissions to the user 14. Types of repositories include an online repository 304, a personal repository, and a core repository. The online repository 304 (described in detail below) is a repository that can store rooms, objects, and/or items available for reuse by any user provided access by the owner. The online repository 304 may or may not be connected to the internet, however, it is available via a network 420 (described in detail below). The online repository 304 may be located on a server either within the local network or on the internet. The personal repository is a repository of which the user 14 is the owner and is not accessible by other users unless the user 14 grants access permissions; further, objects, action scripts, scriptable actions, and other items may not be copied or edited by other users without permission from the owner, the user 14. The virtual reality world authoring system 10 also includes a core repository. The core repository is a repository of rooms, objects, and/or items available to the user 14 that are provided by, owned by, and, by default, included with the virtual reality world authoring system 10. The user 14 has permissions to copy and then modify and use the objects within the core repository while the user creates virtual environments.

Referring now to FIG. 1, shown therein and designated by reference numeral 10 is an exemplary embodiment of a virtual reality world authoring system having a user 14 with a VR headset 18 displaying a virtual environment 22 with objects 26. Also shown are the virtual environment generator component 28 storing one or more computer application having VR design features including an Object Builder 30, Environment Building Tools 34, a script builder 38, Trigger Objects 42, a physics engine 46, and a bidirectional state API 50.

In one embodiment the user 14 is not a programmer and does not know a programming language. The user 14 uses the VR world authoring system to build the virtual environment 22 without writing computer code. The user 14 may build the virtual environment 22 alone or may work together with additional users 14. When working with others, user 14 may work on a local copy of the virtual environment 22 or may work in the virtual environment 22 shared with the other users 14.

The VR headset 18 is a head-worn apparatus that covers the user's eyes for an immersive three-dimensional experience. The VR headset 18 may be self-contained, that is, the VR headset 18 may have a virtual environment generator component comprising a non-transitory memory storing computer code and a processor, that when executing the computer code, generates the virtual environment 22. In other embodiments, the VR headset 18 may be separate from the virtual environment generator component but instead be in communication with the virtual environment generator component through a communication component. The VR headset 18 may include other components such as a human interface device or environmental stimulators.

The communication component is a component of the VR headset having circuitry or other hardware that implements a communication protocol that provides for communication between the VR headset 18 and other components. The communication protocol may include, but is not limited to, one or more of the following: wired communication, WiFi, Bluetooth, Wireless PAN, IR, or other radio-based or light-based communication conventions.

In one environment, the user 14 uses the VR headset 18 to display the virtual environment 22 whereas in another environment the user 14 displays the virtual environment 22 on one or more other screens such that the displayed virtual environment 22 on the one or more screens immerses the user 14 in the virtual environment 22.

The virtual environment 22 is established and run by the virtual environment generator component. The virtual environment 22 may be available to the user 14 only or it may be available to more than one user 14 at a time. In one embodiment, the virtual environment 22 is hosted on a server accessible by the user 14. The server may be connected to the headset over a network connection either locally (intranet) or externally (internet).

The virtual environment 22 may be run by the user in at least a run mode or a design mode. In design mode, the user 14 experiences the virtual environment 22 in a more static simulation, that is, the user 14 can add or remove objects from the virtual environment 22 or may turn on or off physics and other object properties. In run mode, the user 14 experiences the virtual environment 22, with the simulation enabled, as though the user 14 is a part of the virtual environment 22. In order for the user 14 to enable run mode, the virtual environment 22 must first be created in design mode. When the simulation is enabled, the physics engine is fully enabled.

In one embodiment, the virtual environment 22 comprises one or more simulation parameters and the plurality of virtual reality objects 26 (objects 26). An object is an empty container of items. Each item is a reference, comprising a pointer, to related files and content data associated with the object; an embedded file, that is, the object contains the file data for that specific item; or, another object. The object and each of the items contained in the object enjoin in a hierarchical relationship such that the object may be considered a parent to each of the items, which are in-turn, siblings to one another. In another embodiment, an item may also be a container for items, or subitems, such that the item is a parent to the subitems and is a child to the object. In one embodiment, the object 26 contains a metadata item, that is, a file that stores properties of the object 26 such as mass of the object 26, elasticity of object 26, and material of object 26. Each of the properties in the metadata item may be needed by the physics engine to properly simulate the interaction between the object 26 and any other object in the virtual environment.

Figure 2:
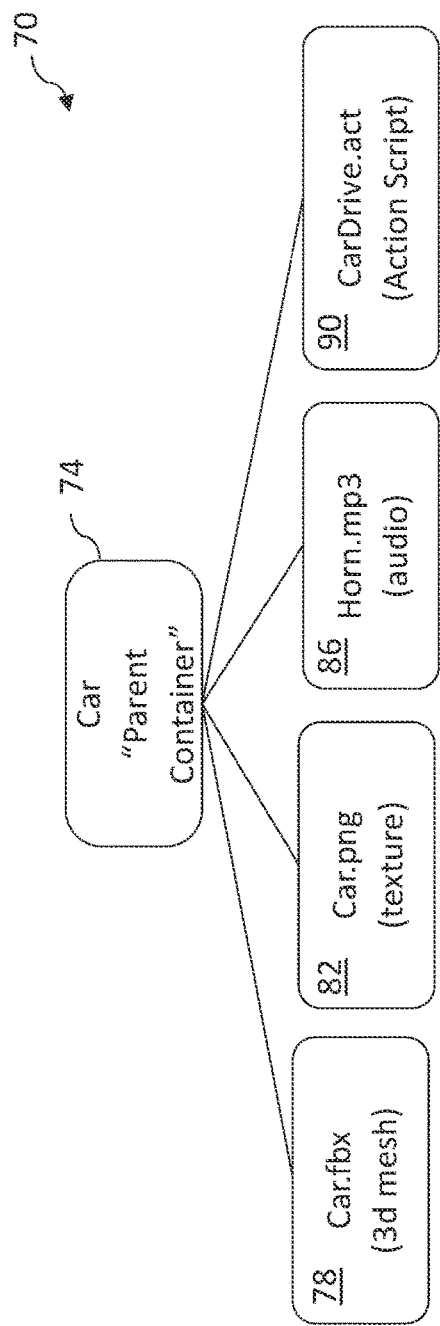
FIG. 2 is a block diagram of an exemplary embodiment of a car object.

Referring now to FIG. 2, shown is an exemplary embodiment of a car object 70 having a parent container 74 and a plurality of items including a 3d mesh 78, a texture 82, an audio 86, and an action script 90. As seen in FIG. 2, each of the items attached to the parent container 74 of the car object 70 extend the car object 70. The plurality of items identified above are for example purposes only and are not intended to be limiting. As defined above, an item is any file that may extend or provide additional information about the object 26. For example, items may also include document files, such as but not limited to doc, docx, ppt, pptx, pdf, and txt, hyperlinks, such as but not limited to URLs, video files, such as but not limited to mp4, avi, mpeg, or mov, or special purpose items.

The 3D mesh 78 is a three-dimensional wireframe representation of the car object 70. It is a base model of an object before any texture or smoothing has been applied. Exemplary 3D mesh file types include, but are not limited to, stl, obj, fbx, collada, 3ds, vrml, and x3d.

The texture 82 is a two-dimensional graphics file that contains the visual texture of the car object 70. When the car object 70 is rendered in three dimensions by the graphics processor, the texture 82 is applied to the 3D mesh 78. Exemplary 2D graphics file types include, but are not limited to, jpg, gif, png, bmp, and tiff.

The audio 86 is an audio clip that is associated with the car object 70. The audio 86 may include any sounds that the car object 70 emits or may include any sound modifications to another sound file that may be played when another object interacts with the car object 70. Exemplary audio file types include, but are not limited to, midi, mp3, wav, and ogg.

Special purpose items are items that exhibit complex functionality which would otherwise be difficult to obtain without programming and can be attached to an object similar to any other item. Special purpose items enable users 14 to build feature rich virtual environments without programming. In one embodiment, special purpose items may include, but are not limited to, items such as a video player item, an audio player item, a document viewer item, or a quiz item.

The video player item provides the functionality to play video file items, such as those attached to objects, or video streams, such as those at the end-point of a hyperlink object. By providing this item, a user can stretch this item over a 3D mesh to form a virtual display such as, but not limited to, a virtual TV screen, a movie screen, or a computer monitor.

Similarly, the audio player item provides the functionality to play audio file items, such as those attached to the object, or audio streams, such as those at the end-point of a hyper-link object. The user 14 may implement this item into simple features such as a radio within the car object 70.

The document viewer item provides the code to allow the user 14 to implement a presentation by implementing the document view item on a mesh. Similarly, the quiz item may be implemented by the user 14 by attaching the quiz item having multiple elements to a mesh where each element relates to an answer, output of the quiz item may be the index of the selected answer.

An item is embedded in an object when the item's file data is saved together with the file data for the object. For example, the 3d mesh 78 is said to be embedded in the car object 70 when the 3d mesh 78 data is serialized and saved within the same file as the parent container 74 irrespective of the encoding used. Therefore, moving the file location of the parent container 74 also moves the data for the 3d mesh 78. Similarly, deleting the parent container 74 also deletes the embedded data including the data for the 3d mesh 78.

An item is referenced by an object when a link or reference is stored within the parent container 74 of the car object 70. The link or reference may be, for example purposes only, a pointer to any of a location in memory, a file system, a web resource such as a hyperlink, or a database. When the item is referenced, the item's encoded data is not stored with the parent container 74 and is not serialized and packed with the parent container 74. Therefore, not only is the parent container 74 of a smaller size on the computer memory, but also, were the parent container 74 deleted, the pointer to the item will be deleted, however, the item data will not be deleted.

Figure 3:
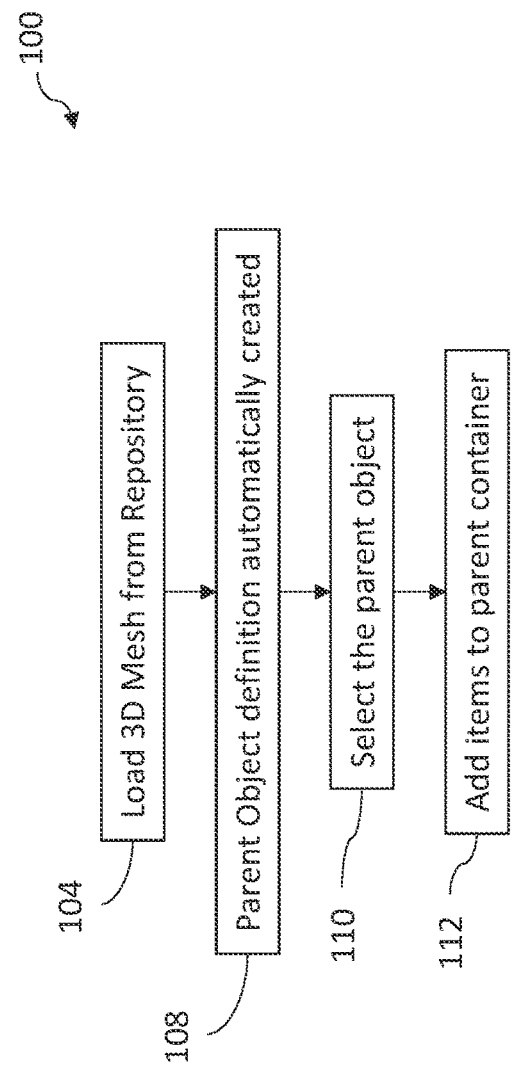
FIG. 3 is a flow diagram of an exemplary embodiment of an object configuration process.

In order to implement the object 26 within the virtual environment 22, the object 26 must first be configured. Referring now to FIG. 3, shown is an exemplary embodiment of an object configuration process 100. Generally, the object configuration process comprises the steps of loading a 3d mesh from a selected repository (step 104), automatically creating the parent object (step 108), and adding one or more items to the parent container (step 112). In one embodiment, adding one or more items to the parent container (step 112) may further include using coordinate links to link objects to one another in order to form a complex object.

Figure 4:
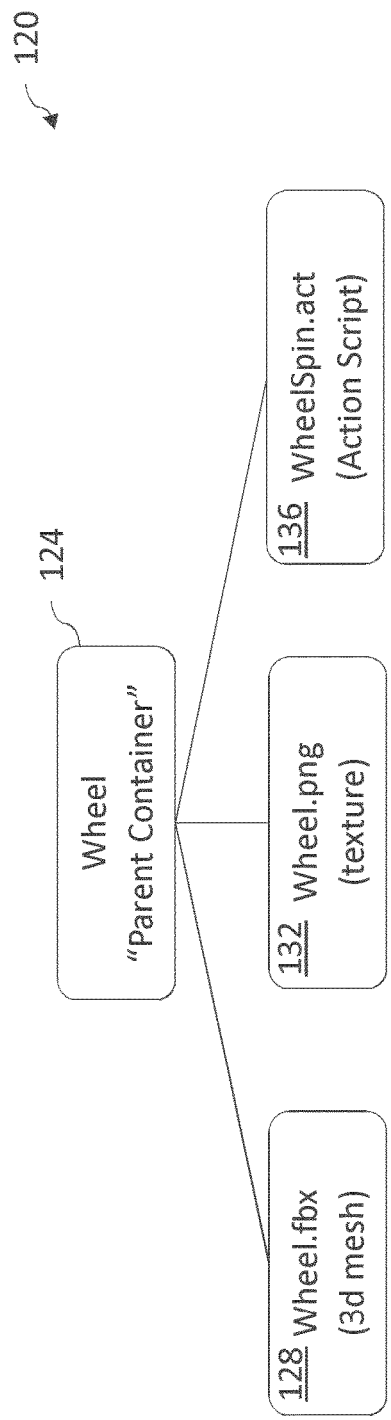
FIG. 4 is a block diagram of an exemplary embodiment of a wheel object.

Referring now to FIG. 4, shown therein is an exemplary embodiment of a wheel object 120 having a wheel parent container 124, a 3d mesh 128, a texture 132, and an action script 136. The wheel parent container 124 contains references to or copies of the 3d mesh 128, the texture 132 and the action script 136. The 3d mesh 128 is a three-dimensional wireframe structure representing a wheel. The wireframe structure is comprised of points or vertices joined by lines or edges. Each of the vertices is connected to another vertex by at least one edge. The texture 132 is a texture file that, when processed with the 3d mesh 128, wraps the 3d mesh 128 in an image. For example, the texture 132 may wrap the 3d mesh 128 to cause the 3d mesh 128 to appear like a wheel would in real-life. In other embodiments, the texture 132 is calculated based on other properties of the object, such as the object material and the properties of that material.

Figure 5:
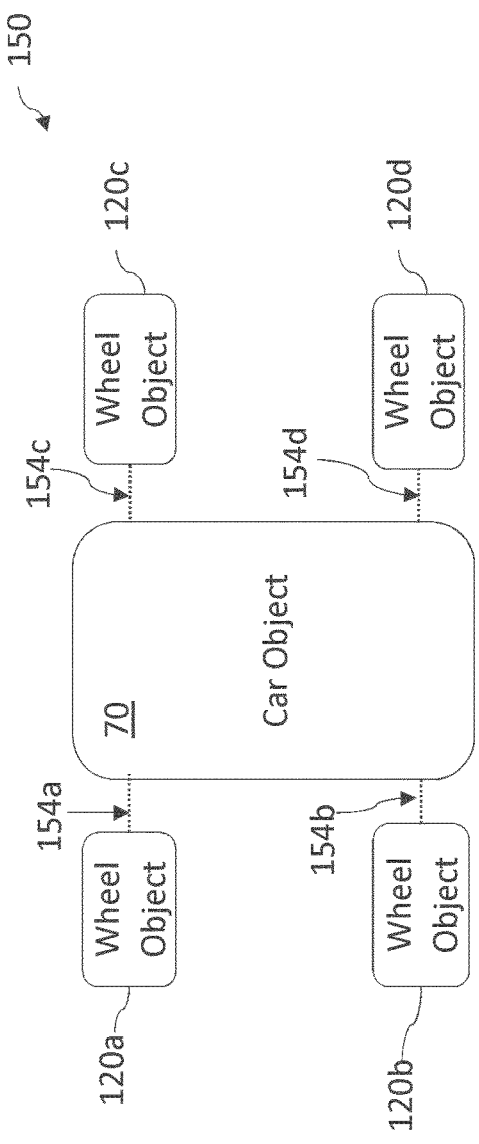
FIG. 5 is a top plan view of a complex object formed of the car object of FIG. 2 and the wheel objects of FIG. 4.

Referring now to FIG. 5, shown therein is an exemplary embodiment of a complex car object 150 having one car object 70 and four wheel objects 120*a-d*. The 3d mesh 78 of the car object 70 exists in three-dimensional space and has coordinates defining the boundary of the 3d mesh wireframe, the coordinates being a location in three-dimensions defined, for example, by cartesian coordinates in (X, Y, Z) form. The wheel objects 120*a-d* are attached to the car object 70 by coordinate links 154*a-d* such that the first coordinate link 154*a* links the coordinates of the wheel object 120*a* to the first coordinates of the car object 70, the second coordinate link 154*b* links the coordinates of the wheel object 120*b* to the second coordinates of the car object 70, the third coordinate link 154*c* links the coordinates of the wheel object 120*c* to the third coordinates of the car object 70, and the fourth coordinate link 154*d* links the coordinates of the wheel object 120*d* to the fourth coordinates of the car object 70. In one embodiment, the coordinate link includes a three-dimensional range, also called connection strength, which provides a range within which the objects are connected to one another.

The coordinate links 154*a-d* maintain the relative distance between each of the wheel objects 120*a-d* and the car object 70 thereby attaching each of the wheel objects 120*a-d* to the car object 70. Each of the complex car object 150 items, car object 70 and wheel objects 120*a-d*, may operate independently of one another while maintaining a physical connection with the connection links 154*a-d*.

Figure 6:
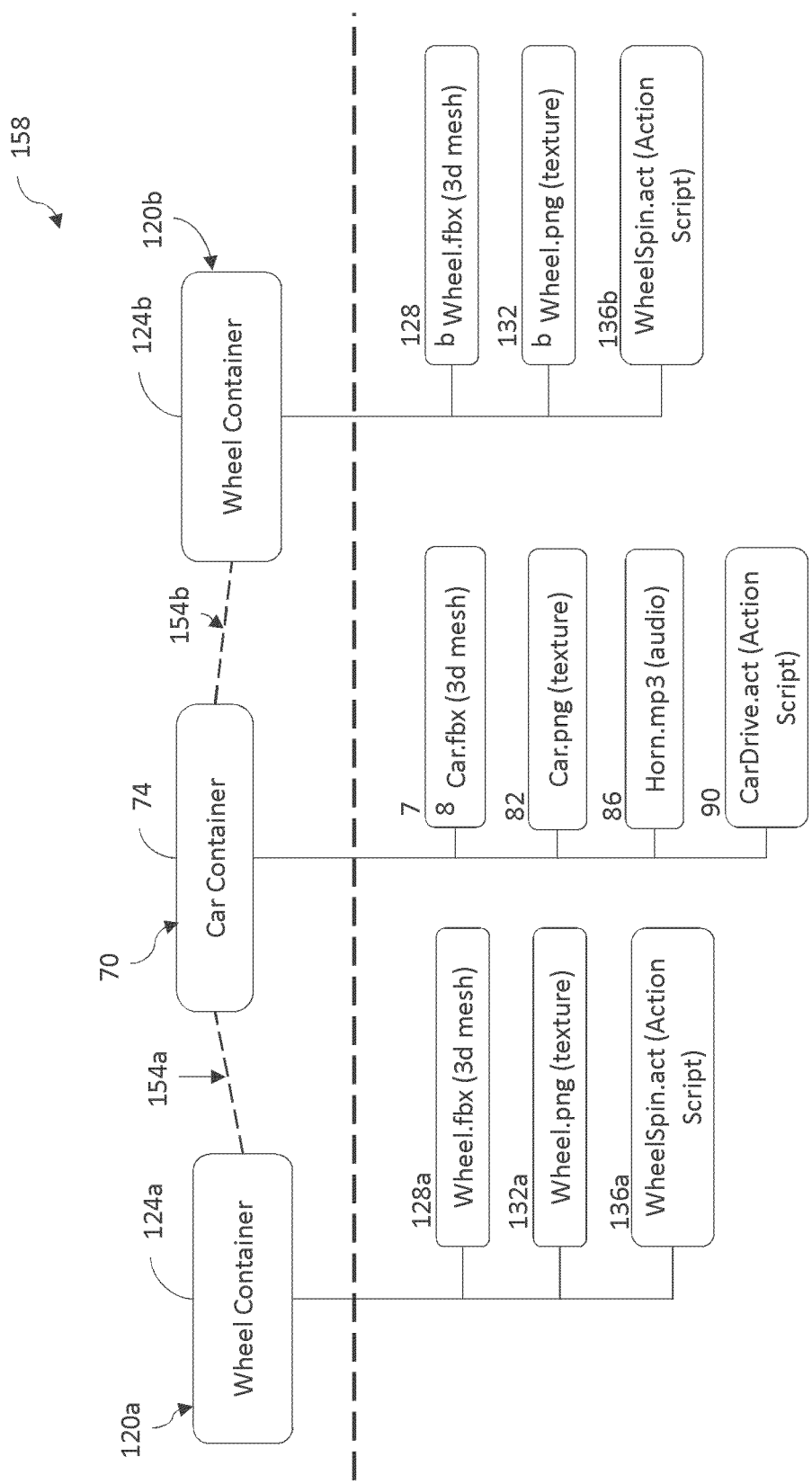
FIG. 6 is a block diagram of an exemplary embodiment of an object relationship model forming the complex object of FIG. 5.

As shown in an exemplary object relationship model 158 in FIG. 6, the parent container 74 and the wheel containers 124*a* and 124*b* (as well as 124*c* and 124*d*, not shown) are joined in a lateral relationship through the connection links 154*a-d*, rather than a hierarchical relationship, in order to form the complex car object 150.

Figure 7:
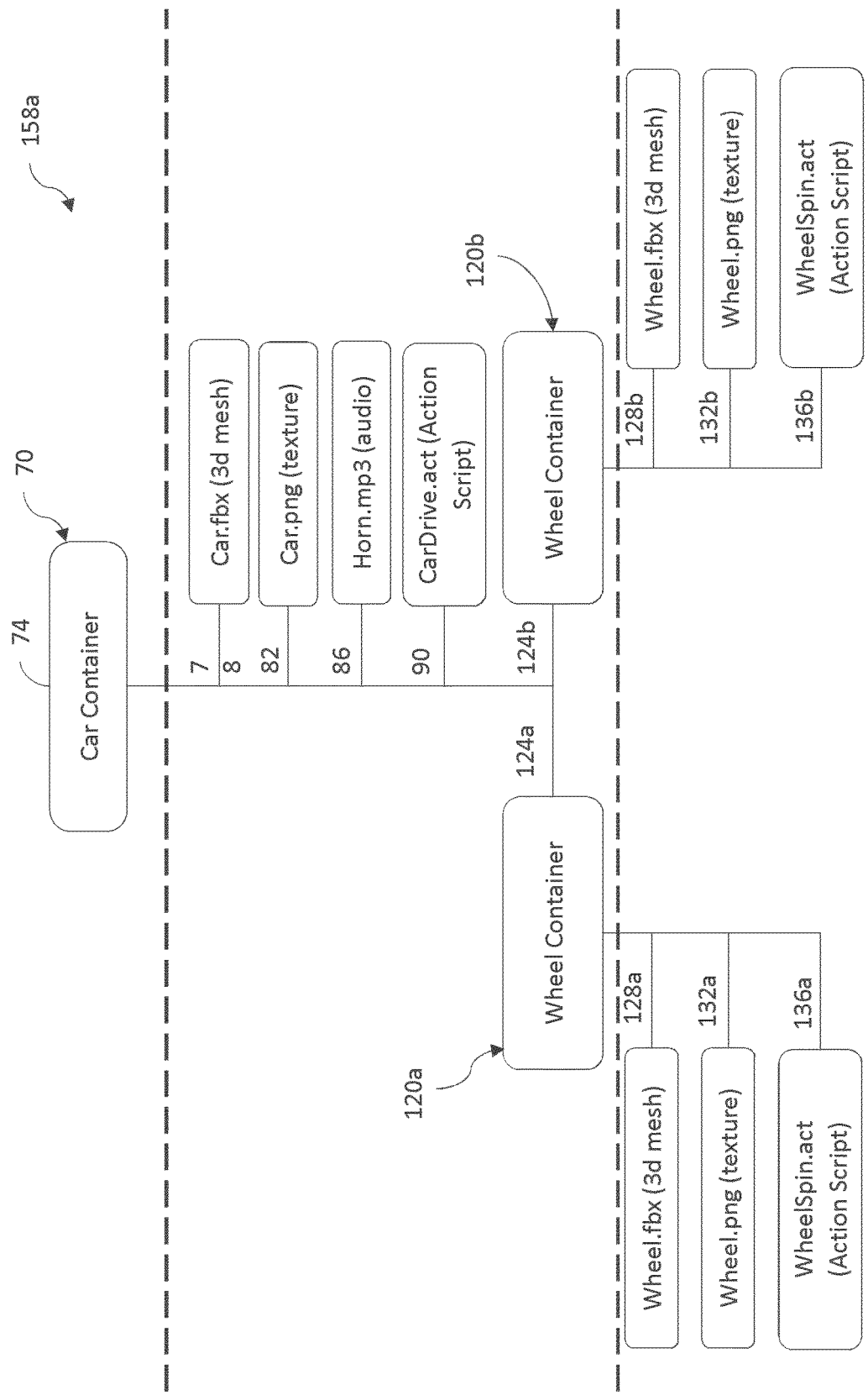
FIG. 7 is an exemplary embodiment of a hierarchical object relationship model forming the complex object of FIG. 5.

As shown in another exemplary hierarchical object relationship model 158*a*, the complex car object 150 may be formed through a hierarchical, parent-child relationship between the car object 70 (the parent) and each of the wheel objects 120*a-d* (the children), as shown in FIG. 7. Again, wheel object 120*c* and 120*d* are not shown for simplicity. The hierarchical object relationship model 158*a* shows the wheel containers 124*a* and 124*b* at the same hierarchical level as other items in the parent container 74 such as the 3d mesh 78, the texture 82, the audio 86, and the action script 90 while the items within each of the wheel containers 124*a*, 124*b* are of a lower hierarchical level than the items within the parent container 74.

In one embodiment, objects in a parent-child relationship forming a complex object do not maintain relative distance as determined by a connection strength between the objects, rather, the child objects are attached to the parent object such that any directional movement of the parent object likewise moves the child objects all the while maintaining the ability of each of the objects to interact independently of the complex object through the use of the action script item.

The user 14 places the one or more objects within the virtual environment using an Environment Building System.

Figure 8:
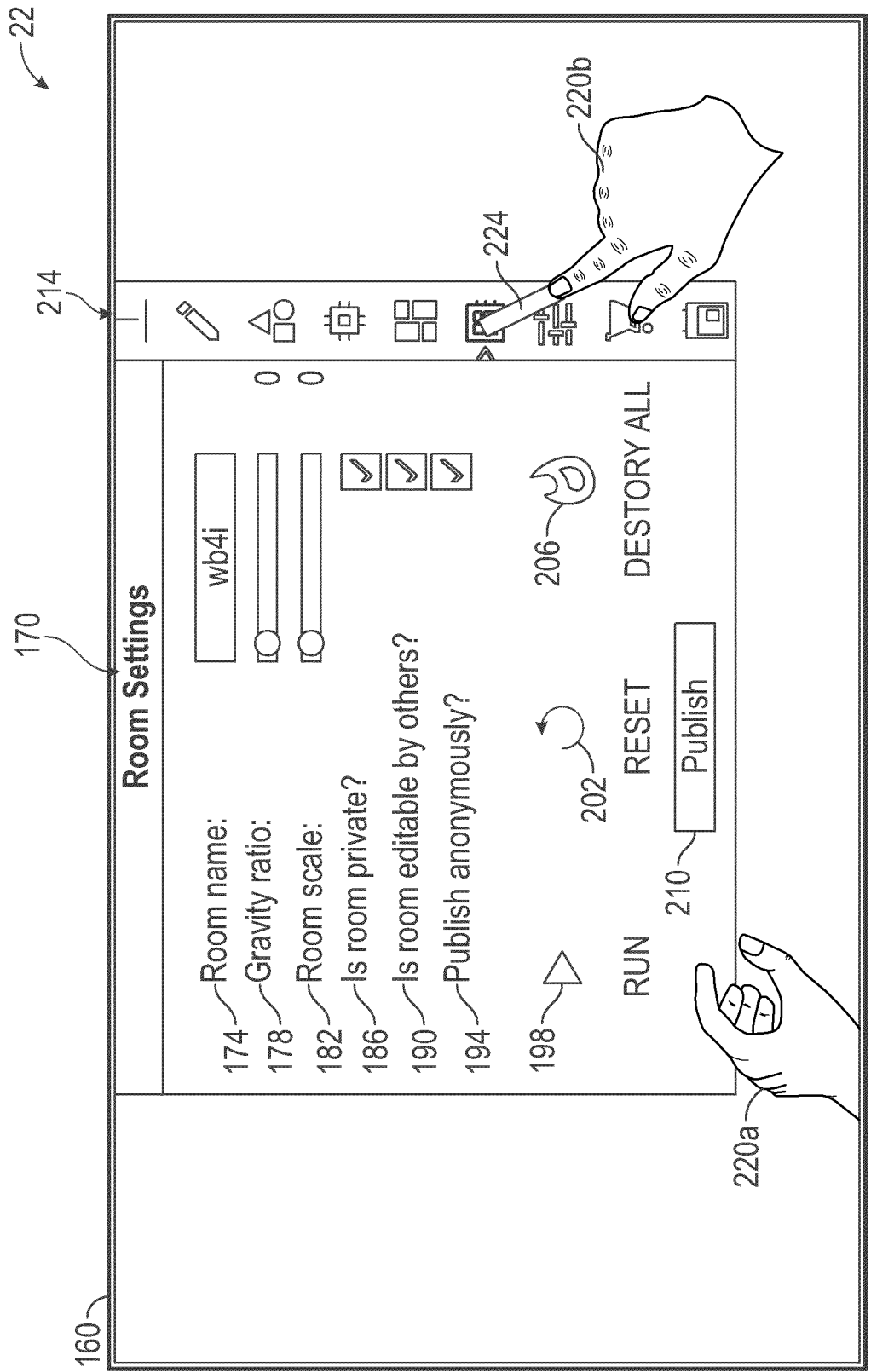
FIG. 8 is a screen shot of an exemplary embodiment of a virtual environment showing an exemplary room settings menu.

As shown in FIG. 8, while in a room 160, the Environment Building System provides the user 14 with a room settings menu 170 that enumerates controls including a room name field 174, a gravity control 178, a scale control 182, a private control 186, an editable control 190, an anonymously publish control 194, a run control 198, a reset control 202, a destroy control 206, a publish control 210, or a settings menu 214. Also shown in the virtual environment 22 are virtual hands 220*a* and 220*b* and a cursor 224.

The cursor 224 is a virtual environment representation of a point within the virtual environment 22 that will be affected by input from the user 14 and is moveable by the user 14. For example, the cursor 224 may be a line extending from a first location within the virtual environment 22, that the user 14 would interpret as coinciding with the user's hand, to a second location within the virtual environment 22, that the user 14 would interpret as being the point within the virtual environment 22 selected by the user's hand. In another embodiment, the cursor 224 is a geometric figure located at the second location within the virtual environment 22 that the user 14 would interpret as being the point within the virtual environment 22 corresponding to the user's hand.

The room 160 is a specific virtual environment 22 that the user 14 has made or downloaded. The room 160 provides the initial structure of the virtual environment 22 and can store environment settings that are applicable to any objects within the room 160. For example, the user 14 may use the gravity control 178 within the room settings menu 170 to adjust the gravity within the room. By using the gravity control 178, the user 14 adjusts how gravity behaves against all objects within this specific virtual environment 22. Additionally, the user 14 can use the scale control 182 to scale the room. In one embodiment, the scale control 182 will adjust the relative sizes of all objects within the room 160 such that, from the user's perspective, the user appears to grow or shrink. By selecting the private control 186, the user 14 can prevent the room 160 from being searchable within the repository. The user 14 can also adjust whether their room 160 is editable by other users by toggling the editable control 190. The user 14 also has the option to publish their room 160 anonymously to one or more repositories by using the anonymously publish control 194. By using the reset control 202, the user 14 can revert changes back to the most recent save. The room settings menu 170 also allows the user 14 to delete the room 160 and all instances of objects within the room 160 by selecting the destroy control 206, thereby reverting the room to a blank virtual environment similar to the environment upon initializing a new room. Upon selection, the publish control 210 allows the user 14 to publish the room 160 to one or more repository consistent with other settings within the room settings menu 170, such as anonymous publishing, whether the room is private, and whether the room is editable. Additionally, by publishing the room, all objects within the room are also published, thereby enabling a third-party user to download and open a fully functional room with all custom objects, mirroring the room as it was most recently published by the user 14. In another embodiment, upon selecting the publish control 210, the user 14 is presented with a repository menu thereby allowing the user to select the repository to which the room 160 is published. The room settings menu 170 also provides a settings menu 214 that enables the user 14 to select a different menu within the Environment Building System, such as but not limited to those menus described in more detail below.

In one embodiment, the room 160 can be saved as a room save file containing all settings for the room, such as those settings adjusted within the room settings menu 170, as well as references to all of the objects within the room. For each object within the room, the room save file stores default settings including, but not limited to, a starting position for the object, a starting rotation for the object, a starting scale for the object, whether the object is affected by gravity, whether the object is grabbable, and the like. Object default settings such as the starting position, starting rotation, starting scale, and other similar properties may have values corresponding to three dimensions, such as X, Y, Z values for positioning or scale, and angular rotation values for the starting rotation for the object. The room 160 is saved with the value of the room name field 174, thereby enabling the user 14 to retrieve the room through an easily recognizable label, the room name.

In one embodiment, the room settings menu 170 further includes a save control enabling the user 14 to save the room 160 in its current state to a save file having a save name. When the save control is selected, a save file location screen may or may not load, enabling the user 14 to save the room 160 in a different file location than the most recent save file. Alternatively, when the user 14 selects the save control to save the room 160, the room 160 is saved to the same save file as the most recent save file. The save file may be titled the same as the room name field 174 value, or the save file may further include a datetime stamp in the save name, thereby enabling the user 14 selecting a virtual environment to load to select a previous save file if so desired. In one embodiment, when the publish control 210 is selected, the room 160 is automatically saved or a save confirmation screen appears offering the user 14 at least the same options as the save control does.

Figure 9:
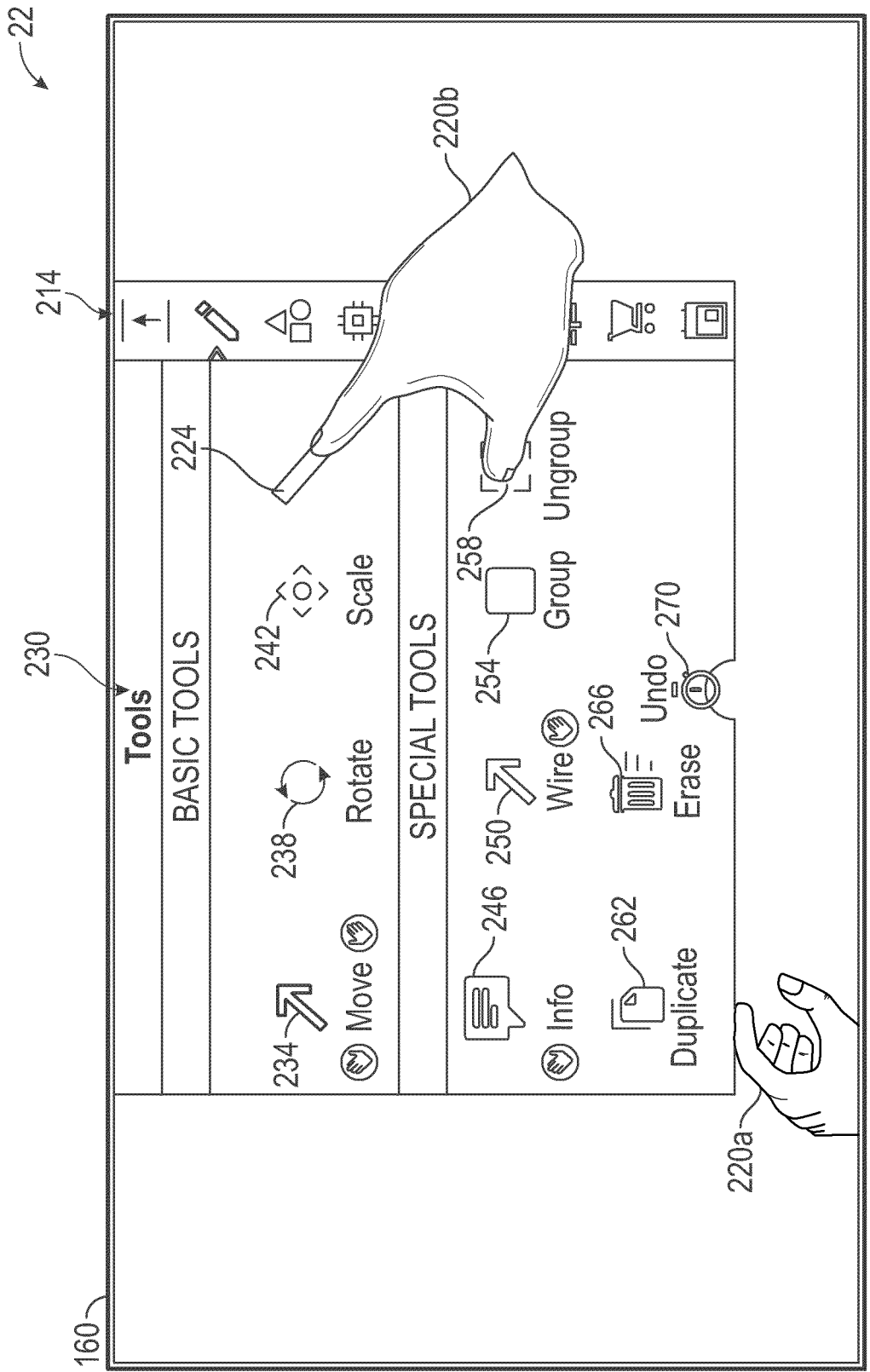
FIG. 9 is a screen shot of an exemplary embodiment of a virtual environment showing an exemplary tools selection menu.

Referring now to FIG. 9, shown therein is an exemplary embodiment of a tools menu 230 for the room 160 within the virtual environment 22. The tools menu 230 lists a suite of three-dimensional object manipulation tools including a move tool 234, a rotate tool 238, a scale tool 242, an info tool 246, a wire tool 250, a group tool 254, an ungroup tool 258, a duplicate tool 262, and an erase tool 266. The tools menu 230 also provides an undo tool 270 and the settings menu 214. Also shown within the room 160 are the virtual hands 220a and 220b as well as the cursor 224. While only the above tools are listed in the tools menu 230, the tools menu 230 is not an exhaustive list of the tools available to the user 14. Other tools may include those that would allow a user to copy dimensions from one object to another, copy attributes, such as texture or color, from one object to another, copy one or more object items from one object to another object, reset an object to its base settings, and/or other object manipulations. Further, the organization of the tools within the tool menu 230 is for convenience only, and the tools can be organized in other arrangements. In one embodiment, the user 14 can move one or more tools within the tool menu 230 to reorganize the tools in an order that the user 14 finds most convenient.

The move tool 234 allows the user 14 to select an object within the room 160 and move that object to another location within the room 160. Similarly, the rotate tool 238 allows the user 14 to rotate a selected object in three-dimensional space, and the scale tool 242 allows the user to scale an object, that is increase or reduce its size, within the room 160. Other tools include the info tool 246 that will display the properties and metadata of a selected object, the duplicate tool 262 that will duplicate a selected object and its children, and the erase tool 266, that will erase the selected object and its children items. Tools available for working with or creating complex objects further include the wire tool 250, which provides a method for the user to wire objects together using coordinate links 154, the group tool 254, which allows a user to group a selection of objects together forming a complex object comprising the selected objects, and an ungroup tool 258, which separates a complex object into its constituent objects. In one embodiment, the ungroup tool 258 can also separate an object and its items, that is removes the one or more items from the parent container, such that the items are independent of the object and are then considered objects themselves. The tools menu 230 also provides the undo tool 270 that allows the user 14 to undo, or reverse, the most recent change to one or more objects within the room 160. The tools menu 230 similarly includes the setting menu 214, which enables the user 14 to select a different menu within the Environment Building System, such as but not limited to the room settings menu 170 or a scriptables menu 340 (described in detail below).

Figure 10:
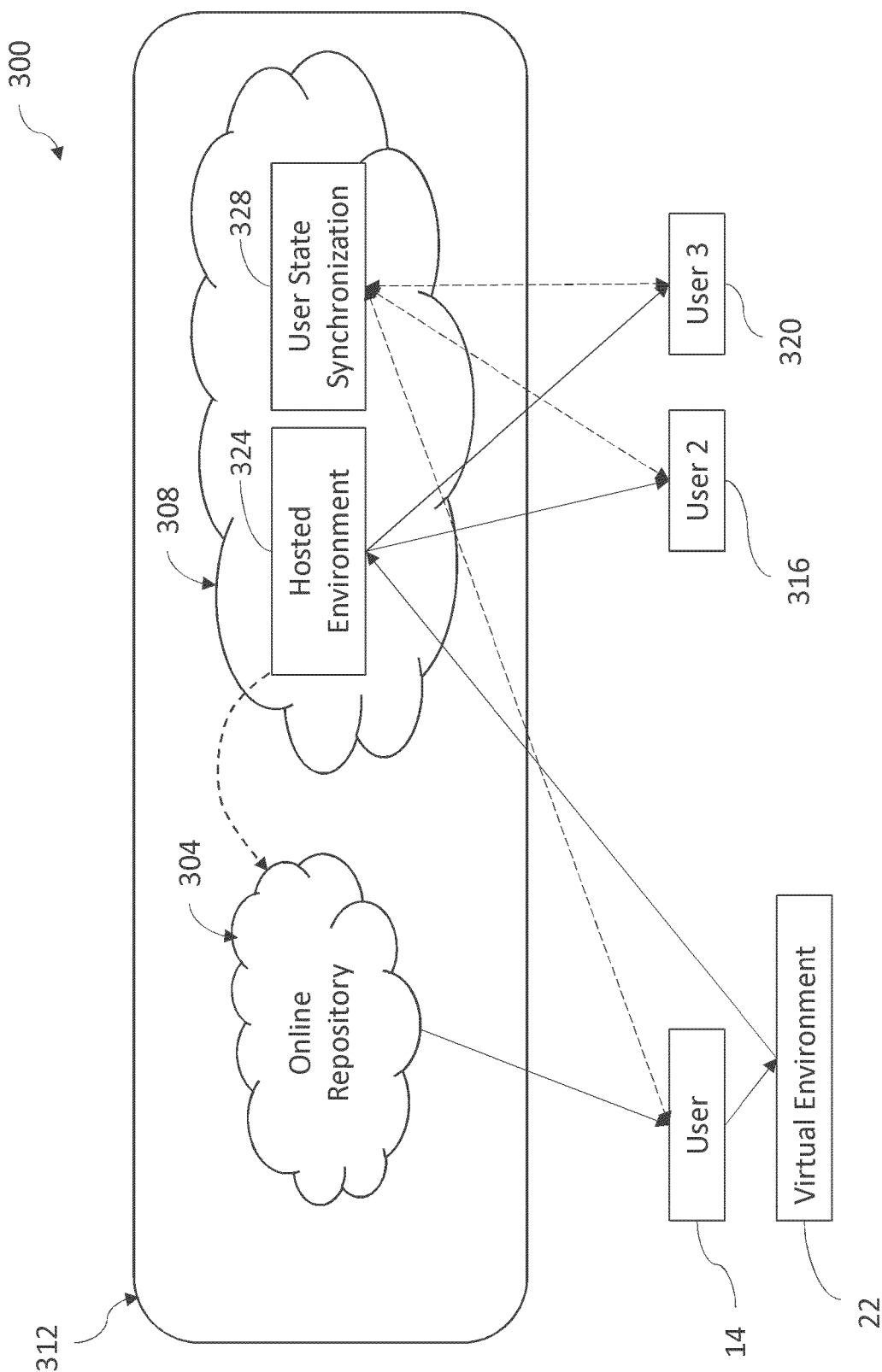
FIG. 10 is an exemplary embodiment of a network diagram for multi-user access to a virtual environment.

Referring now to FIG. 10, showing an exemplary embodiment of a network diagram 300 having an online repository 304 and a virtual environment component 308 hosted on one or more servers 312 that enable a second user 316 and a third user 320 to connect to a virtual environment 22 developed and owned by user 14. The virtual environment component 308 comprises a hosted environment 324 and a user state synchronization component 328. The hosted environment 324 is the virtual environment owned by user 14 and may be uploaded and hosted online from within the virtual reality world authoring system 10. The user 14 may allow others, in this case the second user 316 and the third user 320, to join the hosted environment 324. The user 14 may also prohibit the second user 316 and the third user 320 from copying the hosted environment 324, the virtual environment 22, any of the one or more objects within the virtual environment, or any of the one or more items within the virtual environment into that user's personal repository or into any other environment that user has access to. The permissions of controlling the access to the hosted environment 324, the virtual environment 22 or the like can be implemented using standard computer techniques, such as access control lists, and the like.

Any room created is said to be persistent, that is, the room, if saved, will store the state and location of all objects within the room at a first point in time, and when the user opens the room at a second point in time the state and location of all the objects within the room is the same as at the first instance in time. At a second instance in time after the first instance in time, the user 14 can load the room 160 in design mode and edit the room 160. Additionally, the user 14 can copy the room 160 to create a second room. The objects and items in the second room will have the same state and location as all the objects and items in the room 160 at the point in time at which the second room was created.

In one embodiment, there is an online marketplace wherein individuals can give or sell one or more action modules to a user 14 or submit actions to one or more repositories. A user 14, in need of a new action module or set of action modules can connect to one or more additional repositories wherein additional action modules or sets of action modules are available. By connecting to the repository, the user 14, will gain access to the action modules or sets of action modules available in the repository for use within the user's virtual environment 22.

The user 14 or other users 14 can search within one or more repository for one or more rooms 160 that are searchable. In one embodiment, the search can be performed based off of the room name field 174 and/or the user's username or handle if the user 14 has not selected the anonymously publish control 194. In other embodiments the search can be made on environmental settings such as gravity level, theme, and/or any other searchable characteristic of the room 160.

When the second user 316 or the third user 320 connect to the hosted environment 324, the connecting user 316 or 320 will automatically connect to the online repository 304 and download the room, objects, and items needed to virtualize the hosted environment 324 before joining the room 160. If the connecting user 316 and/or 320 have permissions to join the room 160, each likewise have at least read permissions for each of the objects and items within the room 160.

Additionally, in order for the second user 316 or the third user 320 to connect to the hosted environment 324, each of the connecting users' coordinates within the virtual environment 22, each of the connecting users' necessary state parameters, and all objects and items are synchronized through the user state synchronization component 328 and sent to each of the one or more users within the hosted environment 324. Thus, when the user 14 moves within the hosted environment 324, both the second user 316 and the third user 320 observe the user 14 movements as though each of the users could see the others in person. The user state synchronization component 328 further provides any connected user the ability to see each other and move around the hosted environment 324, chat with one another utilizing voice or audio communication components, handle and transfer objects from one user to another, and create notes that display at a specific three-dimensional coordinate point within the hosted environment 324.

In one embodiment, the server 312 is a component of the user's virtual environment generator component. Here, the second user 316 and the third user 320 connect to the user's virtual reality environment component through a network. As discussed more below, the network can be the internet, a local area network, or any other data connection protocol that provides access to the user's virtual environment generating component by the second user 316 or the third user 320.

The virtual reality world authoring system 10 provides the script builder 38 to users 14 enabling the user 14 to create interactive and complex objects within the virtual environment 22. The virtual reality world authoring system 10 does not require the user 14 to write programming code in order to create complex objects through the use of action scripts.

Figure 11:
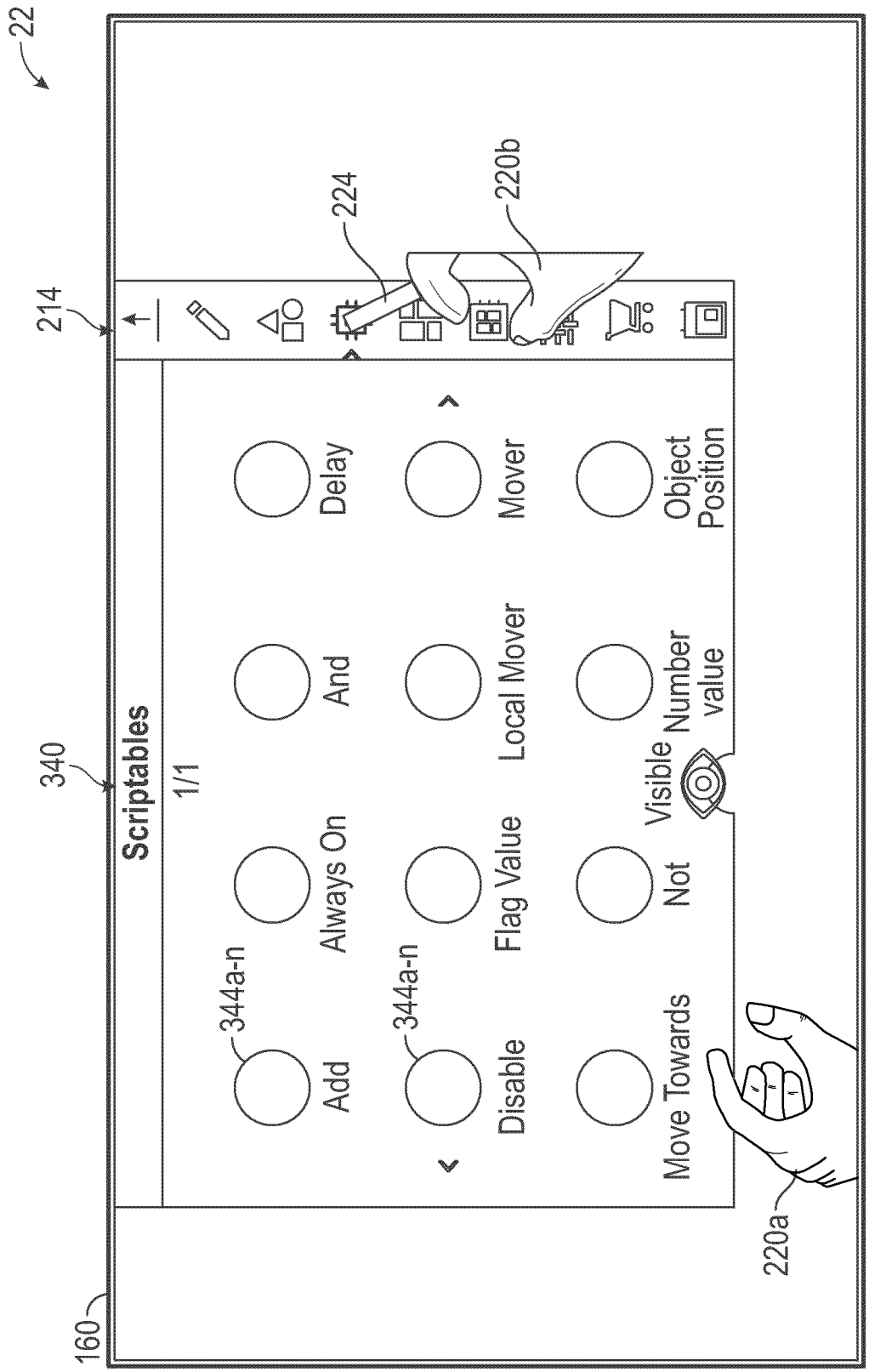
FIG. 11 is a screen shot of an exemplary embodiment of a virtual environment showing an exemplary scriptables menu.

Referring now to FIG. 11, shown therein is the virtual environment 22 of the room 160 having an exemplary embodiment of the scriptables menu 340, the scriptables menu 340 comprising a plurality of scriptable functions 344a-n. The scriptable functions are computer functions having at least one input and at least one output. Scriptable functions may include functions used for manipulating three-dimensional objects dynamically, such as a mover scriptable that will, with an animated effect, move an object from one location to another; a rotator scriptable that describes the rotation of an object in three dimensions, an object position scriptable that immediately sets the three dimensional position of the object, and a disable scriptable that disables action scripts attached to the object. Scriptable functions may also include mathematical functions wherein the inputs may include values to be evaluated and the output is the result of the mathematical function. The mathematical functions may include add, multiply, logical AND, logical OR, logical XOR, and logical NOT. One or more mathematical functions may be connected to the input or the output of another scriptable in order to modify the input or output values respectively. Other scriptable functions may include functions related to time or the passage of time, such as delay or always on. The scriptable functions available can be expanded. For instance, if the user 14 routinely uses the NAND logical operation, the user 14 may form a new scriptable function by linking the logical not scriptable function output to the logical AND scriptable function input and saving the combined scriptable functions into a new, NAND scriptable function. The scriptables menu 340 further has the settings menu 214, which, as described above, enables the user 14 to select a different menu within the Environment Building System, such as but not limited to the room settings menu 170 or the tools menu 230.

Action scripts are modules of Turing-complete computer programmable code comprising one or more scriptable functions. By utilizing action scripts, the user 14 can build complex objects by wiring together action modules without understanding a computer programming language.

Figure 12:
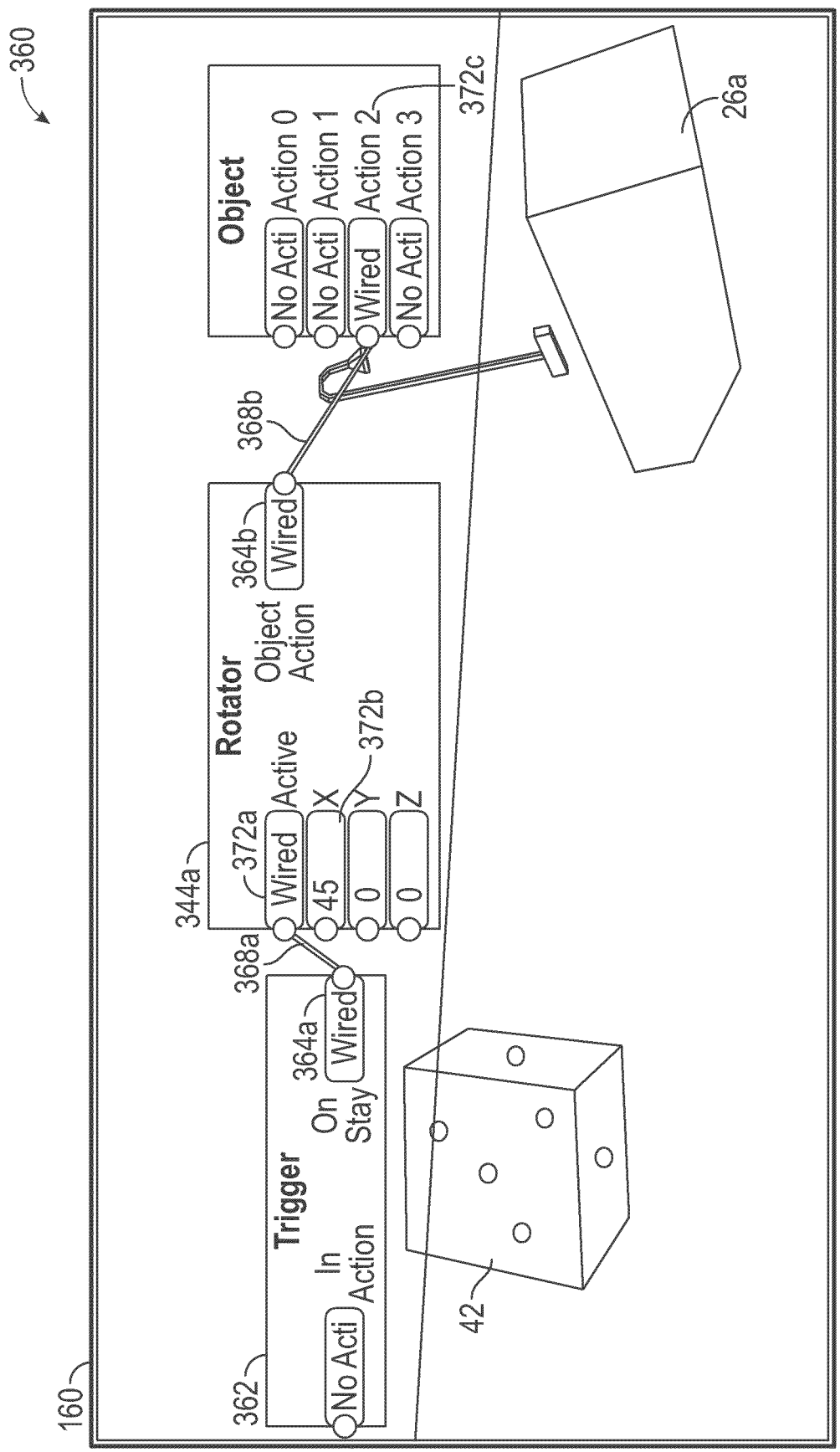
FIG. 12 is a diagrammatic view of an exemplary embodiment of script builder.

Referring now to FIG. 12, shown therein is an exemplary embodiment of a script builder diagram 360. Here, the trigger object 42 (discussed in more detail below) is made available within the room 160. Associated with the trigger object 42 is a trigger scriptable action 362. The trigger scriptable action output 364a is connected by scriptable connector 368a to the rotator scriptable action 344a. The scriptable connector 368a is a visual representation of the path from the trigger scriptable action output 364a to the rotator scriptable action active input 372a. By connecting a first output to a first input with the scriptable connector 368a, the user 14 is directing the script builder 38 to use the value of the first output as the input value to the first input. Also shown is a static rotator scriptable action X input 372b of 45 degrees, that is, 45 degrees is a pre-set input to the rotator scriptable action 344a that represents the number of degrees to rotate in the "x" direction within three-dimensional coordinate space. The rotator scriptable action 344a also accepts an input for the "y" direction and the "z" direction. The rotator scriptable action object output 364b is connected, by scriptable connector 368a, to a bathtub object input 372c of a bathtub object 26a. By connecting the rotator scriptable action object output 364b to the bathtub object input 372c of the bathtub object 26a, the user 14 is indicating that the rotator scriptable action 344a is to be applied to the bathtub object 26a, thereby causing the bathtub object 26a to rotate 45 degrees in the "x" direction when the trigger object 42 calls the rotator scriptable action 344a. By connecting the trigger scriptable action 362 to the rotator scriptable action active input 372a, the user 14 is able to configure when the rotator scriptable action 344a is active and when the rotator scriptable action 344a is inactive based on the output of the trigger scriptable action 362. The connected trigger scriptable action 362, rotator scriptable action 344a, and object property 376 create a first action script that is then stored as an item in the bathtub object 26a parent container. When the script builder diagram 360 is saved, the virtual reality world authoring system 10 processes the script builder diagram 360 and compiles the diagram into a computer language.

The same complex object behavior illustrated by the script builder diagram 360 can be created using a textual script builder. If the user 14 is so inclined, the user 14 can use the textual script builder to program the same bathtub object 26a as created with the script builder 38. The first action script can be written in a text editor and subsequently import the text file into the room 160 of the virtual environment 22. When the virtual environment 22 receives the text file, the virtual environment 22 transforms the first action script into a script builder diagram 360. An exemplary text file may be:

```
//TriggeredRotator.act - commented out filename
[fActivated] > Trigger > [fTriggerCheck]
[fTriggerCheck 45 $ $] > Rotate > [aRotateAction]
```

In the above code, the "fActivated" is a function that receives a condition for the Trigger scriptable action and outputs the fActivated function result and calls the fTriggerCheck function. The fTriggerCheck function receives three parameters, 45, $ and $, where the $ represents a null, or nothing, value. The input values to the Rotate scriptable action are processed output to the aRotateAction as input to the action input of the bathtub object 26a.

In some embodiments, the script builder diagram 360 may show scriptable actions that are not connected to any other scriptable actions. In that case, the scriptable action with no connections to its output will not have any effect on the object 26. For instance, in the script builder diagram 360, id the scriptable connector 368a were not there, the output of the trigger scriptable action 362 would have no effect on the bathtub object 26a, thereby causing the bathtub object 26a to continuously rotate if the rotator scriptable action active input 372a were set to true.

Additionally, the user 14 may desire to create a complex action script with many separate scriptable actions involved. One solution is for the user 14 to select a second action script that is similar to the desired action script, download the second action script and make minor modifications to achieve the desired results. Moreover, when the user 14 searches for and finds an action script, the user 14 may drag the action script from the search and onto the object within the virtual environment 22 to which the user 14 desires to add the action. In other embodiments, actions scripts may include complex actions such as collision avoidance and/or A* algorithm path following, among other complex three-dimensional actions.

Trigger objects 42 are objects having a trigger scriptable action 362 that, when activated, causes one or more scriptable actions attached to one or more objects 26 to activate. The trigger scriptable action 362 may be activated when an object 26, including a user's avatar, interact with the trigger object 42 in a pre-specified manner, such as the user's avatar standing on the trigger object 42 or the object 26 landing on or passing through the trigger object 42. In one embodiment, the interaction may be determined by the physics engine such that if one or more objects 26 are stacked on the trigger object 42 and the one or more objects 26 have a total mass or weight above a trigger threshold, then the trigger scriptable action 362 will be activated. In this scenario, the sum of the objects' mass would be directed to the input of the trigger scriptable action 362. In other embodiment, any property of one or more objects 26 interacting with the trigger object 42 may be used as the input to the trigger scriptable action 362.

Figure 15C:
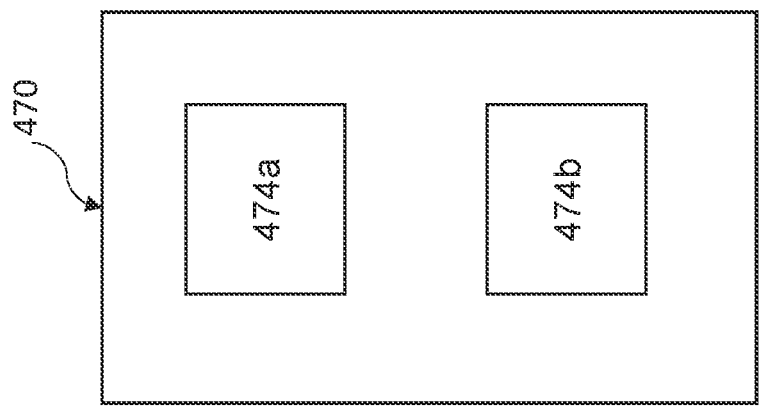
FIG. 15C is an exemplary embodiment of a virtual environment showing a scriptable menu constructed in accordance with the present disclosure.
Figure 15B:
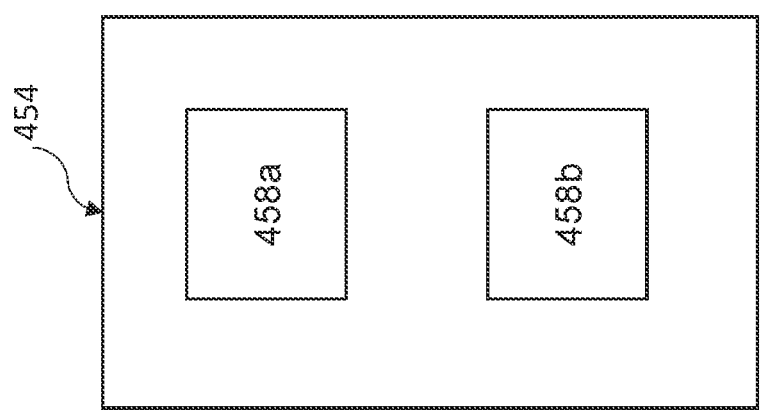
FIG. 15B is an exemplary embodiment of a virtual environment showing a trigger condition menu constructed in accordance with the present disclosure.
Figure 15A:
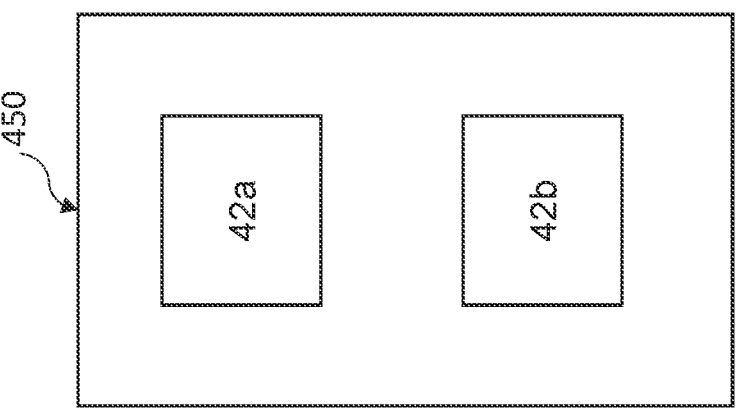
FIG. 15A is an exemplary embodiment of a virtual environment showing a trigger menu constructed in accordance with the present disclosure.

Referring now to FIG. 15A, shown therein is the virtual environment 22 having an exemplary embodiment of a trigger menu 450, the trigger menu 450 comprising one or more trigger object 42, illustrated as trigger object 42a and trigger object 42b. In response to selection, e.g., by the user 14, of a particular trigger object 42, e.g., the trigger object 42a, a trigger condition menu 454 associated with the trigger object 42a, as illustrated in FIG. 15B, is displayed. The trigger condition menu 454 includes a list of one or more trigger condition 458, shown as first trigger condition 458a and second trigger condition 458b. In response to selection, e.g., by the user 14, of the first trigger condition 458a for the trigger object 42a, the user 14 may place the trigger object 42a within the virtual environment 22. Each trigger condition 458, such as the first trigger condition 458a, when met, causes the processor to update the object computer code of the object 26 to include a selected action module.

Action scripts are created by the script builder 38 and used to add interactivity to the virtual environment 22. By creating action scripts that include trigger scriptable actions, the user 14 is able to quickly and easily create complex objects within the virtual environment without programming knowledge. While the breadth and variety of uses for triggers is bound only by the user's imagination, some other examples of using triggers to create interactive complex objects include adding a trigger to a button trigger object such that when pressed, an elevator door opens, adding a trigger to a gun trigger such that when the gun trigger is pulled, the gun fires, or adding a crossing trigger to a doorway such that when the user's avatar crosses the doorway threshold, a quiz object becomes viewable and requests the user 14 for an answer to the quiz presented by the quiz object. In another embodiment, the input to a trigger scriptable action 362 may be a time delay scriptable action such that when the time delay ends, an activate signal is sent from the output of the time delay scriptable action to the input of the trigger scriptable action.

In one embodiment, collision detection is not enabled for objects 26 by default. Instead, to enable collision detection, a trigger object is added, scaled, and connected in a hierarchical, or parent-child, relationship to the object 26. By adding the trigger object 42 and surrounding the object 26, any triggering object that would interact with the object 26 must first pass through the trigger object 42 and thus activate the trigger scriptable action 362. When the triggering object enters the trigger object 42, an entered( ) event for that trigger is raised and an entered( ) event message is created. Likewise, when the triggering object is no longer intersecting with the trigger object, the exited( ) event is fired. An event handler, and or message receiver, handles the entered( ) or exited( ) event or message and activates the trigger scriptable action.

In one embodiment, the dynamics simulation of the physics engine limits the calculated laws of physics to collision detection, Newton's second law and gravity, and rigid body dynamics. If an object 26 within the virtual environment 22 has the physics property set to on and a valid mass property, the physics engine will subject the object 26 to the physics simulation. The rigid body dynamics simulation of the physics engine must account for the angular rotational behavior of objects 26. The combined effects of the calculated laws of physics provide a realistic simulation for most conditions of use. In another embodiment, additional physics simulations are utilized, such as, but not limited to, soft-body dynamics and/or electro-magnetic forces.

In some embodiments, the virtual reality world authoring system 10 further provides a bidirectional state API 50. The bidirectional state API 50 provides bidirectional state information from the real world into the virtual environment 22 and from the virtual environment 22 into the real world. When implementing the bidirectional state API 50, a real-world object may be modeled into a model object that acts as a proxy within the virtual environment 22. In one embodiment, a heart-rate monitor may be attached to the user 14. The heart-rate monitor may then be connected to the bidirectional state API and send heart-rate data from the heart-rate monitor to the virtual environment 22. A heart-rate model object within the virtual environment 22 may receive the heart-rate data as an input and connect the output from the heart-rate model object to the input of a display object thereby providing the user 14 with a display of the user's real-world heart-rate within the virtual environment 22. Likewise, information from within the virtual environment 22 can be transmitted outside the virtual environment 22 and into the real-world. For example, the user's avatar's arm movement data may be recorded and transmitted through the bidirectional state API 50 and into the real world. In the real-world, the arm movement data may be collected and sent to a robotic arm such that the movements of the user's avatar within the virtual environment are mirrored by the robotic arm within the real-world.

One such need for the bidirectional state API 50 is in remote robotic manipulation within hazardous areas. A robot having one or more cameras could be deployed to a hazardous area that is inaccessible to or hazardous to a human person. The one or more cameras on the robot can collect imagery from the real-world and transmit the imagery to the virtual environment. The virtual environment 22 can then use the real-world imagery as texture files for objects generated to reflect the object in the real-world imagery. The user 14, having an avatar of the robot, could then interact with the objects, such interaction can then be mirrored in the real-world by collecting the robot avatar's movement data and transmitting that data back through the bidirectional state API 50 to the robot, thereby causing the robot to mirror, in the real-world, the movements of the robot avatar.

The bidirectional state API 50 is an event processing system and it places events on a queue. The API events relate to messages that should be sent and received by the system. For example, the API event handler may implement the following pseudo-code wherein a received message calls a message_received function and a sent message calls a message_sent function:

```
        switch(event.type)
{       case: "api_message_received:" api_message_recv(state);
        case: "api_message_send"   :   api_message_send(object);
}
```

Exemplary pseudo-code of the above functions may be expressed as:

```
    api_message_recv(state)
    {       objectname = state.objectname
            object = getobjectwithname(objectname)
            object.property1 = state.property1
            object.property2 = state.property2
            object.property3 = state.property3
            .....
    }
    api_message_send(object)
    {       state = new state
            state.objectname=object.name;
            state.property1 = object.property1
            state.property2 = object.property2
            state.property3 = object.property3
            ....
            send_state(state)
    }
```

The send state function sends state information when an api_message_send event occurs. It can do this through any one or more of a variety of protocols both connected and stateless by wrapping the message, serializing it, and sending through the network. The one or more protocols may include http, https, telnet, web sockets, signalr, sockiet.io, or tcp/ip sockets.

Figure 13:
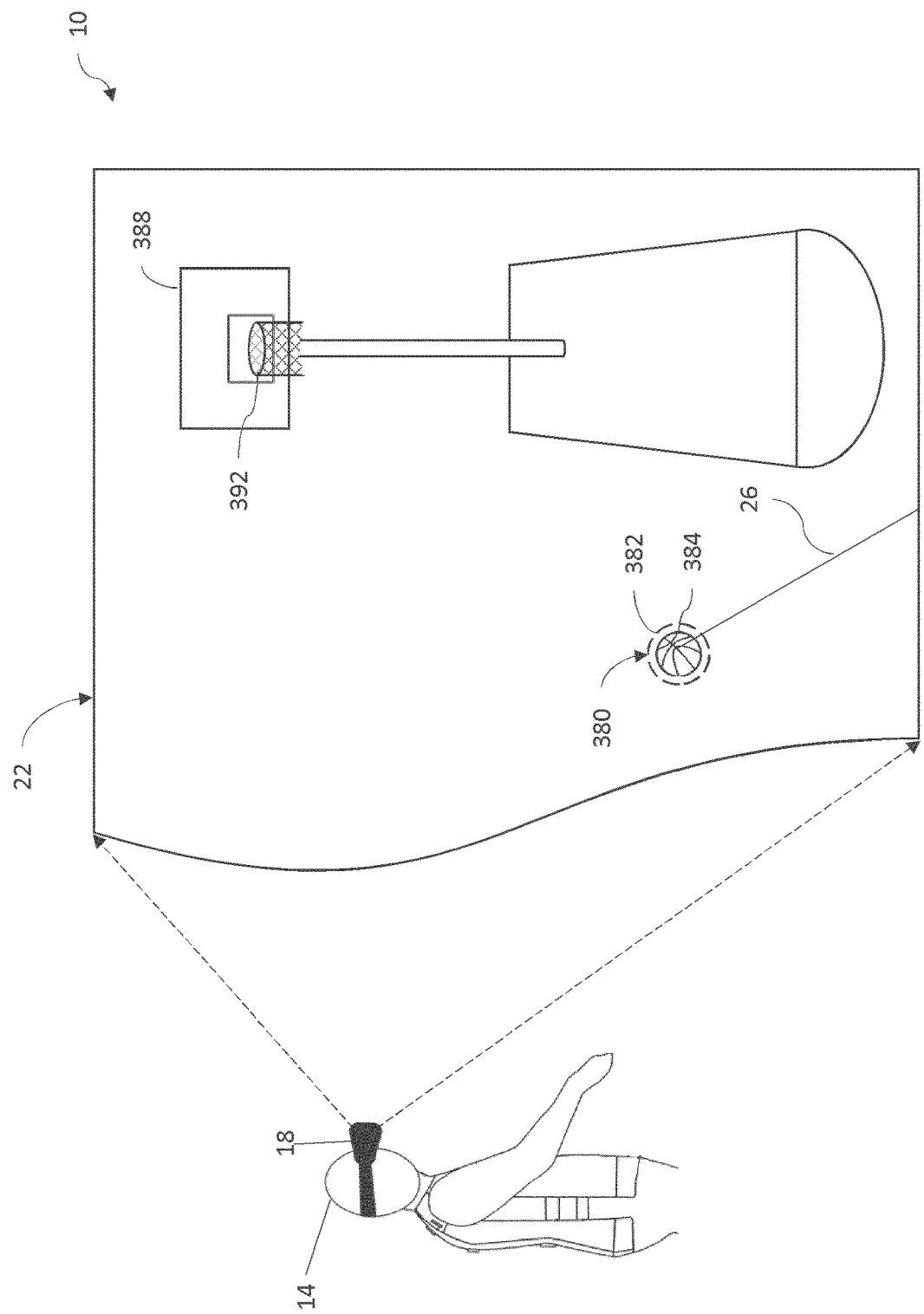
FIG. 13 is a diagrammatic view of an exemplary embodiment of a virtual environment.

Referring now to FIG. 13, shown therein is an exemplary embodiment of the virtual reality world authoring system 10 wherein the user 14 is within the virtual environment 22, the virtual environment 22 being a basketball court having a complex basketball object 380, a basketball object 382, a basketball trigger object 384, a basketball goal object 388 and a complex basketball rim object 392.

To create the complex basketball object 380, the user 14 creates the basketball object 382 having items including a basketball texture, a basketball bounce noise, a basketball metadata item storing basketball physical properties such as mass and elasticity, and a bounce action script. The user 14 also creates the basketball trigger object 384, the basketball trigger object 384 being a spheroid with a radius greater than that of the basketball object. The user 14 connects the basketball object 382 and the basketball trigger object 384 at their center points, thereby causing the basketball trigger object 384 to fully encompass the basketball object 382 within the virtual environment 22 and creating the complex basketball object 380. The bounce action script may take as input values the basketball physical properties including mass and elasticity, as well as a velocity value, to calculate the bounce action.

In order for the complex basketball object 380 to bounce, there must be a force acting on the complex basketball object 380, therefore, collision detection is implemented along with a trigger scriptable action attached to the basketball trigger object 384. With collision detection, when an interfering object intersects with the basketball trigger object 384, a trigger event is raised. The trigger handler responds to the event and activates the trigger scriptable action by calling the input of the trigger scriptable action. When the user 14 selects the trigger scriptable action from a scriptable menu 470 (e.g., a first trigger scriptable action 474a or a second trigger scriptable action 474b from scriptable menu 470 as shown in FIG. 15C), the collision detection and event handling are automatically implemented for the trigger scriptable action. The user 14 can then enter the script builder 38. Here, the user 14 can connect the output of the trigger scriptable action of the basketball trigger object 384 to the input on the bounce scriptable action of the basketball object 382 with a scriptable connector. Other inputs to the bounce scriptable action may include the velocity and/or mass of the interfering object, thereby preventing the bounce scriptable action from causing the complex basketball object 380 from bouncing when the complex basketball object 380 intersects a trigger object 42 or another object that should not have an impact on the complex basketball object. The output of the bounce scriptable action can then be connected to the input action on the basketball object by a second scriptable connecter, the connections from the trigger scriptable action to the bounce scriptable action to the basketball object thereby causing the basketball to bounce when the trigger scriptable action is activated by collision detection.

Similarly, the complex basketball rim object 392 is created by forming a hierarchical relationship between a basketball rim object and a basketball rim trigger object having a rim trigger scriptable action where the basketball rim trigger object is a circular plane circumscribed by the rim and the center-points of both objects are connected. Here collision detection is again needed to test whether one or more interfering objects intersects the basketball rim trigger object. The trigger scriptable action may have a condition that the intersecting object is the complex basketball object in order for the trigger scriptable action to activate the next scriptable action. The user 14 can then enter the script builder 38. Here, the user 14 can connect the output of the rim trigger scriptable action of basketball rim trigger object to the input on a goal scriptable action of a scoreboard object with a scriptable connector. Other inputs to the goal scriptable action are complex basketball object 380 properties such as which team last had control of the ball and a location on the court from which the complex basketball object 380 was released. The output from the goal scriptable action may include the number of points to increase the score and the team for which to increase the score. The output of the goal scriptable action can then be connected to the input action on the scoreboard object by a second scriptable connecter, the connections from the rim trigger scriptable action to the goal scriptable action to the scoreboard object thereby causing the scoreboard to change scores when the rim trigger scriptable action is activated by collision detection.

Figure 14:
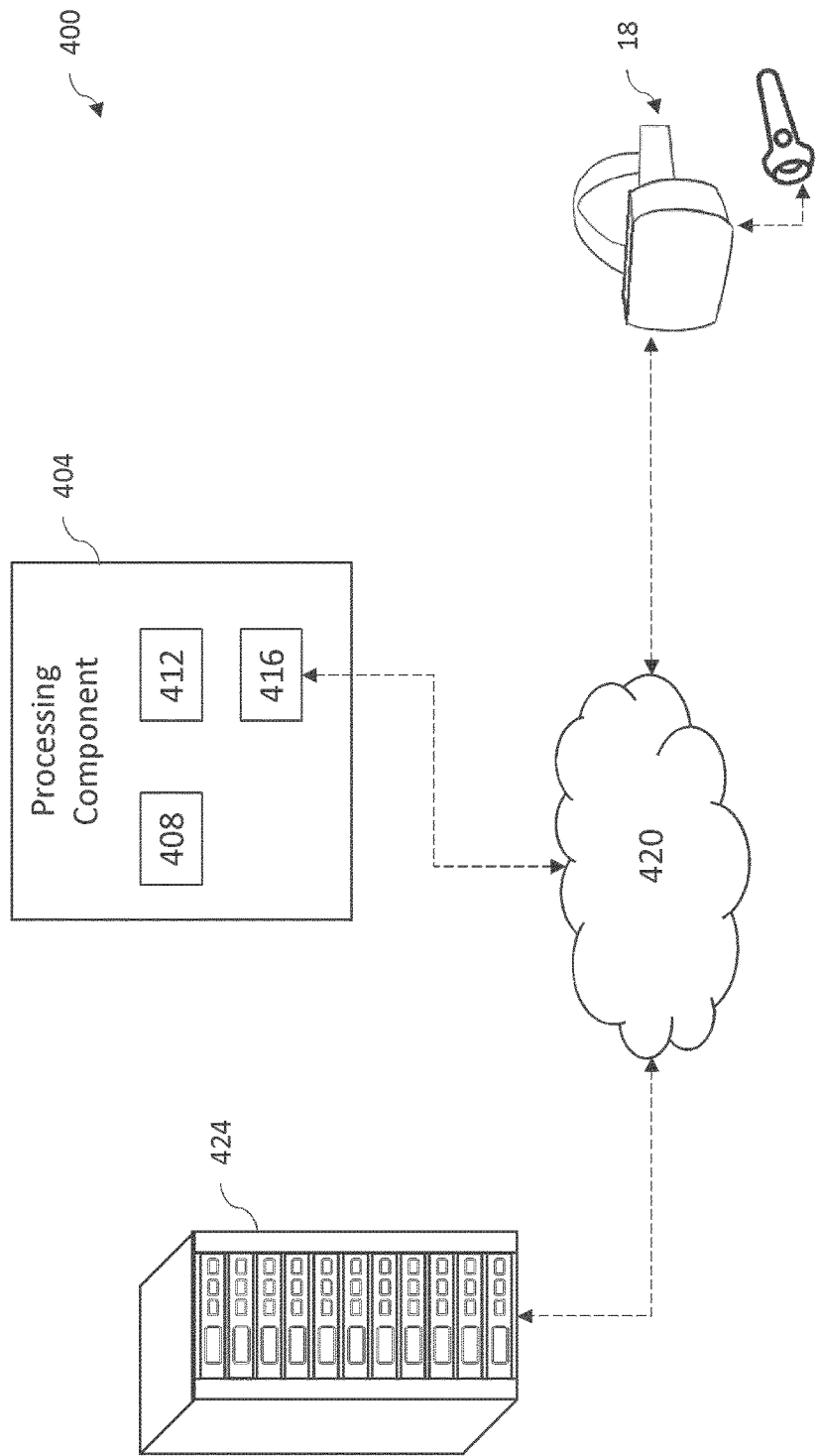
FIG. 14 is an exemplary embodiment of a computer system implementing the virtual reality world authoring system in accordance with the present disclosure.

Referring now to FIG. 14, shown is an exemplary embodiment of the virtual reality world authoring system 10 carried out on one or more computer system 400. The computer system 400 may comprise one or more processing components 404, each processing component 404 having a computer processor 408, one or more non-transitory memory 412, and may include (or be communicatively coupled with) one or more communication component 416. The non-transitory memory 412 may store computer code that implements the virtual reality world authoring system 10. The computer system 400 may include a network 420 enabling bidirectional communication between the processing component 404, the one or more VR headsets 18, and/or a server system 424. The computer processor 408 or multiple computer processors 408 may or may not necessarily be located in a single physical location. In one embodiment, the processing component 404 is integrated with the VR headset 18.

In one embodiment, the network 420 is the Internet, and the VR headsets 18 interfaces with the computer processor 408 via the communication component 416. It should be noted, however, that the network 420 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the processing component 404 having the computer processor 408 and the non-transitory memory 412 may be implemented with the server system 424 having multiple servers in a configuration suitable to provide a commercial computer-based business system such as a commercial web-site and/or data center.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein. For exemplary purposes, examples of VR environment of a basketball court and examples of complex objects of a car are used, however, it is to be understood that the examples are for illustrative purposes only and are not to be construed as limiting the scope of the invention.

What is claimed is:

1. An electronic device comprising:
   a processor;
   a headset having a visual feedback screen;
   one or more user interface devices; and
   a non-transitory computer readable medium storing computer executable code that when executed by the processor cause the processor to:
   project a virtual reality environment to the headset, the virtual reality environment having an object, the object being within the virtual reality environment, created by a container having properties that define how the object interacts within the virtual reality environment, and having a three-dimensional mesh with coordinates defining a boundary of the object;
   in response to a first input from the at least one user interface device, display an action menu within the virtual reality environment on the visual feedback screen, the action menu having a list of pre-defined action scripts, the action scripts including a module of computer executable code having one or more function, the one or more function configured to affect the one or more property of the container within the virtual reality environment; and
   in response to a second input from the at least one user interface device, update the container for the object to include a selected action script, wherein the second input includes dragging, within the virtual reality environment on the visual feedback screen, the selected action script from the action menu onto the object.

2. The electronic device of claim 1, wherein the object is identified before the first input.

3. The electronic device of claim 1, wherein the object is identified after the first input.

4. The electronic device of claim 1, wherein the non-transitory computer readable medium storing computer executable code that when executed by the processor cause the processor to, in response to a triggering event, update the container of the object to include a selected action script.

5. The electronic device of claim 4, wherein the triggering event is raised when a user interacts with a trigger object thereby meeting a pre-determined trigger condition.

6. The electronic device of claim 1, wherein the non-transitory computer readable medium storing computer executable code that when executed by the processor cause the processor to:
   in response to a third input from at least one user interface device selecting a specific trigger object from a trigger menu, display a trigger condition menu having a list of one or more trigger conditions for the trigger object; and
   in response to a selection of a trigger condition for the trigger object, allows the user to place the trigger object into the virtual reality environment,
   wherein the trigger condition, when met, causes the processor to update the object computer code of the object to include the selected action script.

7. An electronic device comprising:
a processor;
a headset having a visual feedback screen;
one or more user interface devices; and
a non-transitory computer readable medium storing computer executable code that when executed by the processor cause the processor to:
  project a virtual reality environment to the headset, the virtual reality environment having one or more object, each of the one or more object being within the virtual reality environment, created by a container having properties that define how the one or more object interact within the virtual reality environment, and having a first three-dimensional mesh with first coordinates defining a first boundary of the object; and
  in response to an input from at least one user interface device, connect a trigger object, having a second three-dimensional mesh with second coordinates defining a second boundary of the trigger object, selected from a trigger menu to the container of a particular object of the one or more object within the virtual reality environment, thereby forming a complex object within the container by linking the particular object and the trigger object using coordinate links between the first coordinates and the second coordinates, the complex object including one or more action script;
  display, in the virtual reality environment on the visual feedback screen, a scriptable menu having trigger scriptable action for the trigger object; and
  in response to a selection of a trigger scriptable action for the trigger object, allow a user to associate the trigger scriptable action to the one or more action script of the complex object.

8. The electronic device of claim 7, wherein the trigger object is identified before the input.

9. The electronic device of claim 7, wherein the trigger object is identified after the input.

10. The electronic device of claim 7, wherein the non-transitory computer readable medium storing computer executable code that when executed by the processor cause the processor to, in response to a trigger event, update the complex object to activate the at least one action script.

11. The electronic device of claim 10, wherein the trigger event is raised when the user interacts with the trigger object thereby meeting a pre-determined trigger condition.

12. A non-transitory computer readable medium storing computer executable code that when executed by a processor cause the processor to:
  project a virtual reality environment to a headset, the virtual reality environment having one or more object, each of the one or more object being within the virtual reality environment, and created by a container having properties that define how the one or more object interact within the virtual reality environment, the one or more object having a three dimensional mesh with coordinates defining a boundary of the one or more object;
  in response to a first input from at least one user interface device selecting a first object of the one or more object within the virtual reality environment, display an action menu on a visual feedback screen having a list of pre-defined action scripts, the action scripts including a module of computer executable code having one or more function, the one or more function configured to affect one or more property of the first object of the one or more object within the virtual reality environment; and
  in response to a second input from the at least one user interface device, update the container for the first object to include a selected action script, wherein the second input includes dragging, within the virtual reality environment on the visual feedback screen, the selected action script from the action menu onto the first object.

13. The non-transitory computer readable medium of claim 12, wherein the first object is identified before the first input.

14. The non-transitory computer readable medium of claim 12, wherein the first object is identified after the first input.

15. The non-transitory computer readable medium of claim 12, wherein the non-transitory computer readable medium storing computer executable code that when executed by the processor cause the processor to, in response to a triggering event, update the container of the first object to include a selected action script.

16. The non-transitory computer readable medium of claim 15, wherein the triggering event is raised when a user interacts with a trigger object thereby meeting a pre-determined trigger condition.

17. The non-transitory computer readable medium of claim 12, wherein the non-transitory computer readable medium storing computer executable code that when executed by the processor cause the processor to, in response to a second input from at least one user interface device selecting a specific trigger object from a trigger menu, display a trigger condition menu having a list of one or more trigger conditions for the trigger object; and in response to a selection of a first trigger condition for the trigger object, allows a user to place the trigger object into the virtual reality environment, the trigger condition, when met, causes the processor to update the container of the first object to include a selected action script.

* * * * *